(12) United States Patent
Dybsetter et al.

(10) Patent No.: US 7,493,048 B2
(45) Date of Patent: Feb. 17, 2009

(54) TRANSCEIVER WITH PERSISTENT LOGGING MECHANISM

(75) Inventors: Gerald L. Dybsetter, Scotts Valley, CA (US); Jayne C. Hahin, Cupertino, CA (US); Luke M. Ekkizogloy, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 427 days.

(21) Appl. No.: 10/883,209

(22) Filed: Jun. 30, 2004

(65) Prior Publication Data

US 2006/0002709 A1    Jan. 5, 2006

(51) Int. Cl.
 *H04B 10/00* (2006.01)
(52) U.S. Cl. .......... 398/136; 398/137; 398/164
(58) Field of Classification Search ..............
  372/29.011–29.015, 29.02; 398/9, 33, 195–198
 See application file for complete search history.

(56) References Cited

U.S. PATENT DOCUMENTS

| | | | |
|---|---|---|---|
| 4,784,454 A * | 11/1988 | Dyott ............... | 385/31 |
| 5,144,632 A * | 9/1992 | Thonn ............... | 372/33 |
| 5,812,572 A * | 9/1998 | King et al. ......... | 372/38.04 |
| 6,400,737 B1 | 6/2002 | Broutin et al. | |
| 6,512,617 B1 | 1/2003 | Tanji et al. | |
| 6,590,644 B1 * | 7/2003 | Coin et al. ......... | 356/218 |
| 6,618,425 B1 * | 9/2003 | Carlesi et al. ...... | 372/109 |
| 6,898,702 B1 * | 5/2005 | Evans ............... | 713/2 |
| 7,215,891 B1 | 5/2007 | Chiang et al. | |
| 2002/0027688 A1 * | 3/2002 | Stephenson ........ | 359/152 |
| 2002/0078403 A1 * | 6/2002 | Gullo et al. ........ | 714/37 |
| 2002/0097468 A1 * | 7/2002 | Mecherle et al. ... | 359/152 |
| 2002/0143920 A1 * | 10/2002 | Dev et al. .......... | 709/223 |
| 2003/0223756 A1 | 12/2003 | Tatum et al. | |
| 2004/0022537 A1 | 2/2004 | Mecherle et al. | |
| 2004/0033079 A1 | 2/2004 | Sheth et al. | |
| 2004/0057730 A1 * | 3/2004 | Littlejohn et al. .. | 398/156 |
| 2004/0136719 A1 | 7/2004 | Hidai et al. | |
| 2004/0175172 A1 | 9/2004 | Aronson et al. | |
| 2004/0183787 A1 | 9/2004 | Geaghan et al. | |
| 2005/0017751 A1 | 1/2005 | Gunn et al. | |
| 2005/0047778 A1 | 3/2005 | Levinson | |
| 2005/0063711 A1 | 3/2005 | Rossi et al. | |
| 2005/0105915 A1 * | 5/2005 | Light ................ | 398/164 |
| 2005/0111845 A1 * | 5/2005 | Nelson et al. ...... | 398/138 |
| 2006/0002707 A1 | 1/2006 | Ekkizogloy et al. | |
| 2006/0002708 A1 | 1/2006 | Hahin | |
| 2006/0018664 A1 | 1/2006 | Levinson et al. | |
| 2006/0034612 A1 * | 2/2006 | Yu et al. ............ | 398/135 |
| 2006/0098699 A1 * | 5/2006 | Sanchez ............. | 372/26 |

OTHER PUBLICATIONS

U.S. Appl. No. 11/220,770, filed Sep. 7, 2005, Ekkizogloy et al.

(Continued)

*Primary Examiner*—Dalzid Singh
(74) *Attorney, Agent, or Firm*—Workman Nydegger

(57) ABSTRACT

An optical transceiver configured to transmit and receive optical signals. The optical transceiver includes a control module and a persistent memory. The control module is configured to identify operational information regarding the optical transceiver, and write log information representing the operational information to the persistent memory. The operation information may include statistical data about operation, or may include measured parameters. Log entries may be made periodically and/or in response to events. The log may then be evaluated to determine the conditions under which the transceiver has historically operated.

27 Claims, 2 Drawing Sheets

OTHER PUBLICATIONS

U.S. Appl. No. 11/468,246, filed Aug. 29, 2006, Dybsetter et al.
U.S. Appl. No. 12/015,240, filed Jan. 16, 2008, Ekkizogloy et al.
U.S. Appl. No. 11/220,770, mailed Apr. 16, 2008, Office Action.
U.S. Appl. No. 10/882,447, filed Jun. 30, 2004, Luke M. Ekkizogloy, et al.
U.S. Appl. No. 10/883,208, Jun. 30, 2004, Jayne C. Hahin, et al.

* cited by examiner

TRANSCEIVER WITH PERSISTENT LOGGING MECHANISM

BACKGROUND OF THE INVENTION

1. The Field of the Invention

The present invention relates generally to optical transceivers. More specifically, the present invention relates to optical transceivers that perform persistent logging of its own operational information.

2. Background and Relevant Art

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver. A controller circuit (hereinafter referred to the "controller") controls the operation of the laser driver and post amplifier.

The operation of optical transceiver is susceptible to its operating environment and to its other operational parameters. One obvious example is the laser bias current. If the transmitter bias current drifts upwards or downwards, a variation in the optical intensity generated by the transmitter may be expected. The transmitted optical power and the received optical power are also important operational parameters. The supply voltage level provided to the optical transceiver also affects its performance.

In addition, temperature can change the operating characteristics of the optical transmitter itself. In particular, the wavelength output of a laser may drift from approximately 0.3 nanometers (nm) to approximately 0.6 nm for every one degree Celsius change in temperature. Since lasers generate heat during operation, this can have a significant effect upon the operation of the laser. Wavelength variations can cause crosstalk, where one transmission becomes confused with another. Furthermore, varying wavelengths due to varying laser temperature may cause different fiber attenuations. Accordingly, laser temperature and wavelength have great influence over the proper operation of the optical transceiver.

High temperatures of the optical transceiver itself may cause temporary or even permanent malfunctioning of not just the laser, but the other electronic components within the optical transceiver. Accordingly, the temperature of the optical transceiver as a whole is also important to the operation of the optical transceiver.

In order to provide proper cooling or heating to the optical transceiver and/or laser, Thermo Electric Coolers (TECs) are often employed, particularly in optical transceivers whose performance is highly temperature-dependent. Such TEC coolers heat or cool depending on the direction and magnitude of current applied to the TEC coolers. Accordingly, the TEC current is also an important operational parameter.

These various parameters (e.g., laser bias current, transmit power, receive power, supply voltage, laser wavelength, laser temperature, transceiver temperature, and TEC current, and the like) are thus important to the operation of the optical transceiver. However, after an optical transceiver malfunctions, it is often difficult to diagnose what the problem has been since there is no conventional mechanism for persistently logging important events that may give an indication as to why the transceiver malfunctioned. For example, if an optical transceiver has an upper temperature rating of 85 degrees Celsius, the optical transceiver may malfunction or even permanently break if its temperature reaches 110 degrees Celsius. Yet, after the fact, it may be difficult to discover that the optical transceiver was subjected to improper temperatures.

Therefore, what would be advantageous is a mechanism for persistently logging events that are important to the operation of an optical transceiver so that these events may be later used to understand the conditions under which the optical transceiver operated.

BRIEF SUMMARY OF THE INVENTION

The foregoing problems with the prior state of the art are overcome by the principles of the present invention. The principles of the present invention may be implemented in an optical transceiver configured to transmit and receive optical signals. The optical transceiver includes a control module and a persistent memory. The control module is configured to identify operational information regarding the optical transceiver, and write log information representing the operational information to the persistent memory.

The operational information may include operational data such as, for example, the total operational time, a number of times the optical transceiver has been booted, an average operational time between boots, a total number of error conditions encountered, an identification of one or more error conditions encountered, a categorization of the number of error conditions encountered for a plurality of different error types, or the like. The operational information may also include operational measurements along with the time of measurement. The measured items may include a laser wavelength, a laser temperature, a supply voltage, a transceiver temperature, a laser bias current measurement, a Thermo Electric Cooler (TEC) current measurement, a transmit power measurement, a receive power measurement, or the like. For a given operational parameter, the log entries may be made periodically, and/or in response to certain events.

Since the operational information is recorded to persistent memory, the persistent memory may be evaluated after a failure of the optical transceiver, to properly diagnose the operational circumstances surrounding the failure. This is particularly important for optical transceivers, which are highly sensitive to environmental and operational conditions. In one embodiment, the persistent memory is on a single chip that may be communicated with using a known interface. For example, the persistent memory may be an EEPROM that may be communicated with using, for example, I²C.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to an optical transceiver configured to transmit and receive optical signals. The optical transceiver includes a control module and a persistent memory. The control module is configured to identify operational information regarding the optical transceiver, and write log information representing the operational information to the persistent memory. The operation information may include statistical data about operation, or may include measured parameters. Log entries may be made periodically and/or in response to events. The log may then be evaluated to determine the conditions under which the transceiver has historically operated. An example operational optical transceiver environment will first be described. Then, the operation in accordance with the invention will be described with respect to the operational environment.

Figure 1:
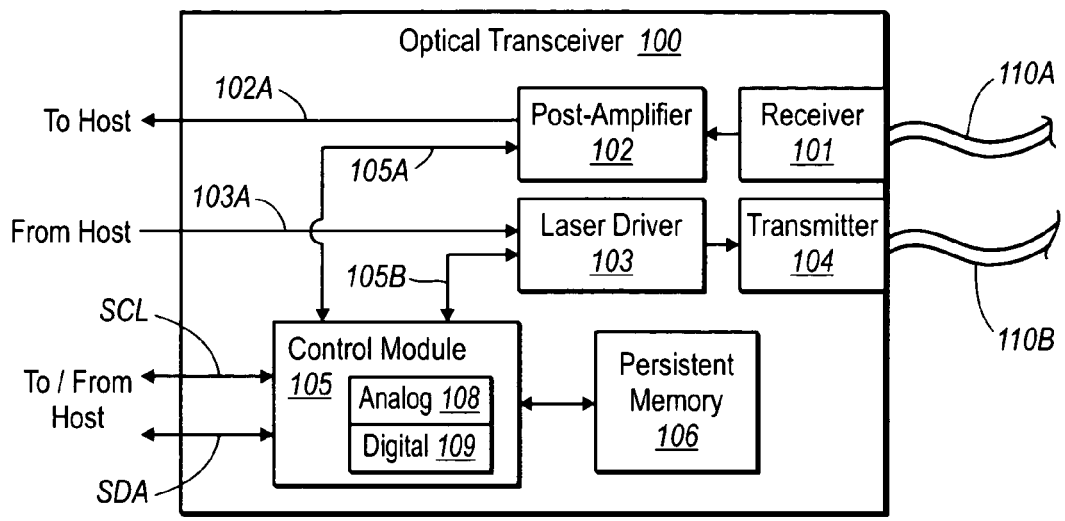
FIG. 1 schematically illustrates an example of an optical transceiver that may implement features of the present invention.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention allow for persistent logging of operational information of an optical transceiver. This will become increasingly important for faster bit rates transfers. Accordingly, the principles of the at present invention are suitable for 1G, 2G, 4G, 10G and higher bandwidth fiber optic links as sensitivity to operational circumstances increases. Furthermore, the principles of the present invention may be implemented in laser transmitter/receivers of any form factor such as XFP, SFP and SFF, without restriction. Having said this, the principles of the present invention are not limited to a laser transceiver environment at all.

The optical transceiver 100 receives an optical signal from fiber 110A using receiver 101. The receiver 101 acts as an optoelectric transducer by transforming the optical signal into an electrical signal. The receiver 101 provides the resulting electrical signal to a post-amplifier 102. The post-amplifier 102 amplifies the signal and provides the amplified signal to the host as represented by arrow 102A.

The optical transceiver 100 may also receive electrical signals from the host for transmission onto the fiber 110B. Specifically, the laser driver 103 receives the electrical signal as represented by the arrow 103A, and drives the transmitter 104 (e.g., a laser or Light Emitting Diode (LED)) with signals that cause the transmitter 104 to emit onto the fiber 110B optical signals representative of the information in the electrical signal provided by the host. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the laser transmitter/receiver 100 includes a control module 105, which evaluates temperature and voltage conditions and other operational circumstances, and receives information from the post-amplifier 102 (as represented by arrow 105A) and from the laser driver 103 (as represented by arrow 105B). This will allow the control module 105 to counteract the dynamically varying performance, and detect when there is a loss of signal.

Specifically, the control module 105 may counteract these changes by adjusting settings on the post-amplifier 102 and/or the laser driver 103 as represented by the arrows 105A and 105B. These settings adjustments are quite intermittent since they are only made when temperature or voltage or other low frequency changes so warrant.

The control module 105 has access to a persistent memory 506, which in one embodiment, is an Electrically Erasable and Programmable Read Only Memory (EEPROM). Data and clock signals may be provided from the host to the control module 105 using the serial clock line SCL, and the serial data line SDA. Also data may be provided from the control module 105 to the host using serial data signal SDA to allow for digital diagnostics and readings of temperature levels, transmit/receiver power levels, and the like.

Figure 2:
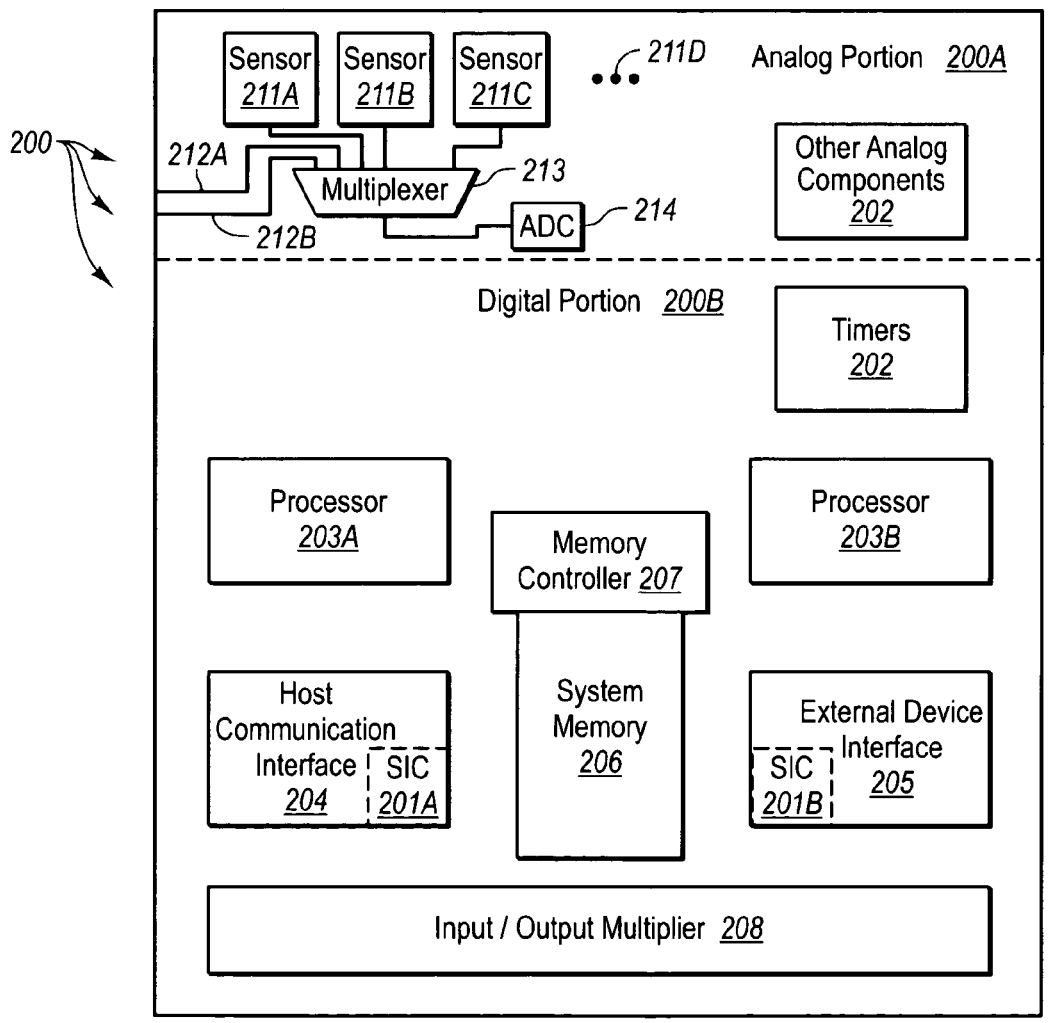
FIG. 2 schematically illustrates an example of a control module of FIG. 1.

The control module 105 includes both an analog portion 108 and a digital portion 109. Together, they allow the control module to implement logic digitally, while still largely interfacing with the rest of the optical transceiver 100 using analog signals. FIG. 2 schematically illustrates an example 200 of the control module 108 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, and analog to digital converters, high speed comparators (e.g., for event detection), voltage based reset generators, voltage regulators, voltage references, clock generator, and other analog components. For example, the analog portion includes sensors 211A, 211B, 211C amongst potentially others as represented by the horizontal ellipses 211D. Each of these sensors may be responsible for measuring operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each value may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components. The high speed comparators may be supplied with one input being from an internal sensor or from an external line to receive a measured parameter value. The other input to the comparator may be a comparison value. Should the measured parameter value exceed the comparison value, the comparator may generate a logical high (or low) which indicates that the event has occurred. For example, suppose that the standard maximum transceiver temperature is 85 degrees Celsius. The actual measured transceiver temperature may be provided as one input to a comparator, while a value representing 85 degrees Celsius is provided to the other input of the comparator.

The digital portion 200B of the control module 200 may include a timer module 202 that provides various timing signals used by the digital portion 200B. Such timing signals may include, for example, programmable processor times. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host using the serial clock line SCL and the serial data line SDA of the optical transceiver 100. The external device interface 105 is used to communicate with, for example, other modules within the optical transceiver 100 such as, for example, the post-amplifier 102, the laser driver 103, or the persistent memory 106.

The internal system memory 206 (not to be confused with the external persistent memory 106) may be Random Access Memory (RAM). The memory control 207 shares access to the system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as I$^2$C or may be another other serial interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the chip. Accordingly, there may be more input\output nodes within the control module 200 than there are pins available on the control module 200, thereby reducing the footprint of the control module 200.

Having described a specific environment with respect to FIGS. 1 and 2, it will be understood that this specific environment is only one of countless architectures in which the principles of the present invention may be employed. As previously stated, the principles of the present invention are not intended to be limited to any particular environment.

Figure 3:
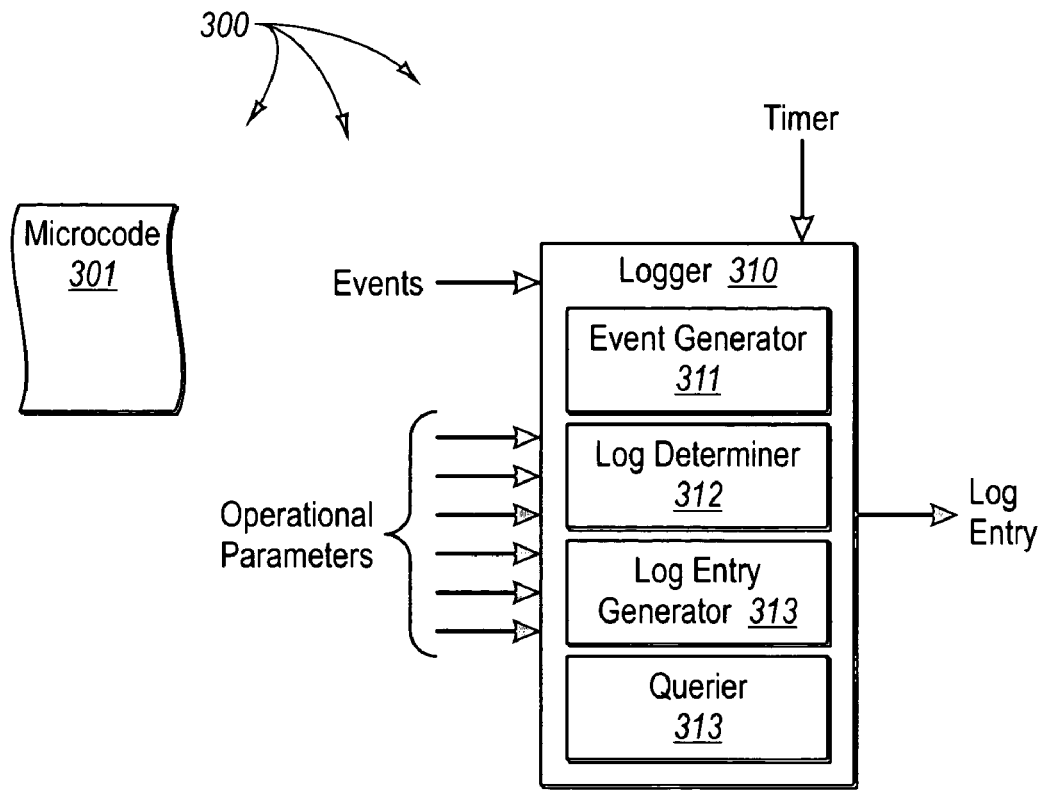
FIG. 3 illustrates a software architecture that may be maintained in system memory during run-time in accordance with the principles of the present invention.

FIG. 3 illustrates a software architecture 300 that may be instantiated in system memory 206. In particular, the processors 203 load microcode 301 from the persistent memory 106 into the system memory 206. The processors 203 then execute the microcode instructions 301. This causes the microcode to form a functional logger object 310 in system memory. Alternatively, the microcode 301 may be directly executed from persistent memory. In that case, the microcode 301 is loaded into the system memory a fraction at a time (e.g., one instruction at a time) for execution by the processor. In this latter case, the system memory may be a register, flip-flops, or any other memory regardless of size or type.

The logger object 310 has access to various operational parameters of the optical transceiver for example, from the ADC 214 or from the external lines 212A and 212B. The logger 310 also may have access to events such as the events generated by the high-speed comparators mentioned above. The logger 310 may also generate its own internal events as represented by events generator 311 based on an evaluation of one or more of the operational parameters. A log determiner 312 identifies when what operational information should be logged. A log entry generator 313 generates the log entries. A queries component 314 may be used to query various portions of the optical transceiver for operational parameters. The logger 310 may also have access to timing signals.

Figure 4:
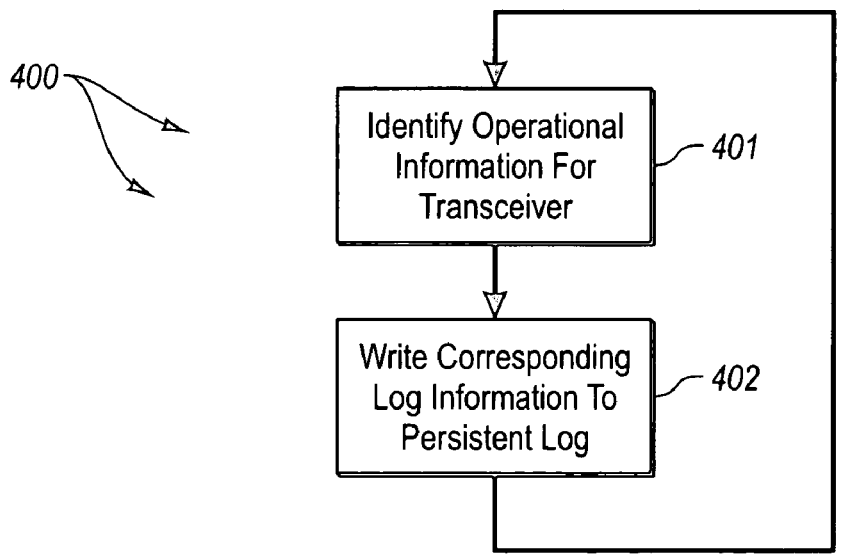
FIG. 4 illustrates a method for logging operational information in accordance with the principles of the present invention.

FIG. 4 illustrates a flowchart of a method 400 for an optical transceiver to persistently log operational data. Once the optical transceiver identifies operational information that is to be logged for the optical transceiver (act 401), the optical transceiver writes log information representing the operational information to a persistent memory within the optical transceiver (act 402). This process may be repeated during operation numerous times. For example, referring to FIG. 3, when-ever an event is generated or an operational parameter value is read, the log determiner 312 determines whether to log that parameter or event. If the operation information is to be logged, the log entry generator 303 then generates the log entry. The external device interface 105 may then be used to write the log entry into the persistent memory 106.

The operation information that may be logged may include statistical information such as, for example, a total operational time, an average operational time between boots, a total number of error conditions encountered, an identification of one or more error conditions encountered, a categorization of the number of error conditions encountered for a plurality of different error types, a number of times the optical transceiver has been booted, or the like. The operational information may also simply record operational parameters measured along with an approximate time of measurement. Such operational parameters may include, for example, a laser wavelength approximation, a laser temperature measurement, a supply voltage measurement, a transceiver temperature measurement, a laser bias current measurement, a Thermo Electric Cooler (TEC) current measurement, a transmit power measurement, a receive power measurement, an acceleration measurement, a peak acceleration measurement, or the like. The operational parameters may be periodically queried using the querier 314 in response to timing signals, or may be identified in response to an event either generated internal to the logger 310 or accessed external to the logger 310.

The persistent memory 106 may be integrated with the controller 105 on the same chip. However, this need not be the case. If the persistent memory 106 was a separate module such as, for example, an EEPROM module, the persistent memory 106 may be unplugged from the optical transceiver 100 to evaluate its memory contents. For example, if a failure were to occur, the various log entries could be evaluated to identify possible causes for the optical transceiver failing. For example, if an event was recorded indicating that the optical transceiver experienced a peak acceleration exceeding 20 times the acceleration imposed by gravity (often referred to as "G's"), then one might infer that the optical transceiver had been dropped. Even if the persistent memory 106 was on a separate chip than the controller 105, the persistent memory 106 may be evaluated without removal from the optical transceiver if the optical transceiver has an external I/O interface that allows the persistent memory 106 to be read.

Accordingly, the principles of the present invention provide for an optical transceiver that persistently logs its own operational information. Should a failure occur (even a power failure), this persistent memory may be evaluated to identify the cause of the failure. Power need not be supplied to the optical transceiver in order to preserve the log entries once the log entries are written. Accordingly, the principles of the present invention represent a significant advancement in the art of optical transceivers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A method for an optical transceiver to persistently log operational data, the method comprising the following:
    an act of the optical transceiver identifying first operational information regarding the optical transceiver, wherein the first operational information represents:
        a total operation time for the optical transceiver;
        a number of times the optical transceiver has been booted;
        an average operational time between boots;
        a total number of error conditions encountered;
        an identification of one or more error conditions encountered; or
        a categorization of the number of error conditions encountered for a plurality of different error types;
    after the act of identifying the first operational information, an act of the optical transceiver writing first log information representing the first operational information to a persistent memory within the optical transceiver;
    an act of the optical transceiver identifying second operational information regarding the optical transceiver; and
    after the act of identifying the second operational information, an act of the optical transceiver writing second log information representing the second operational information to the persistent memory within the optical transceiver.

2. A method in accordance with claim 1, wherein the method is performed by a control module within the optical transceiver, wherein the control module and the persistent memory are integrated on the same chip.

3. A method in accordance with claim 1, wherein the method is performed by a control module within the optical transceiver, wherein the control module and the persistent memory are on separate chips.

4. A method in accordance with claim 1, wherein the second operational information comprises one or more measured operational parameters of the optical transceiver.

5. A method in accordance with claim 4, wherein the second operational information further comprising an approximate time that at least one of the one or more measured operational parameters was measured.

6. A method in accordance with claim 4, wherein the one or more operational parameters of the optical transceiver comprises a laser wavelength approximation.

7. A method in accordance with claim 4, wherein the one or more operational parameters of the optical transceiver comprises a laser temperature measurement.

8. A method in accordance with claim 4, wherein the one or more operational parameters of the optical transceiver comprises a supply voltage measurement.

9. A method in accordance with claim 4, wherein the one or more operational parameters of the optical transceiver comprises a transceiver temperature measurement.

10. A method in accordance with claim 4, wherein the one or more operational parameters of the optical transceiver comprises a laser bias current measurement.

11. A method in accordance with claim 4, wherein the one or more operational parameters of the optical transceiver comprises a Thermo Electric Cooler (TEC) current measurement.

12. A method in accordance with claim 4, wherein the one or more operational parameters of the optical transceiver comprises a transmit power measurement.

13. A method in accordance with claim 4, wherein the one or more operational parameters of the optical transceiver comprises a receive power measurement.

14. A method in accordance with claim 4, wherein the one or more operational parameters of the optical transceiver comprises an acceleration measurement.

15. A method in accordance with claim 14, wherein the acceleration measurement is a peak acceleration measurement.

16. A method in accordance with claim 1, wherein the act of the optical transceiver identifying first operational information is performed periodically with respect to the first operational information.

17. A method in accordance with claim 1, wherein the act of the optical transceiver identifying first operational information comprises an act of identifying that an event indicative of the first operational information has occurred.

18. A method in accordance with claim 1, wherein the optical transceiver is a 1G laser transceiver.

19. A method in accordance with claim 1, wherein the optical transceiver is a 2G laser transceiver.

20. A method in accordance with claim 1, wherein the optical transceiver is a 4G laser transceiver.

21. A method in accordance with claim 1, wherein the optical transceiver is a 10G laser transceiver.

22. A method in accordance with claim 1, wherein the optical transceiver is a laser transceiver suitable for fiber optic links greater than 10G.

23. A method in accordance with claim 1, wherein the optical transceiver is an XFP laser transceiver.

24. A method in accordance with claim 1, wherein the optical transceiver is an SFP laser transceiver.

25. A method in accordance with claim 1, wherein the optical transceiver is a SFF laser transceiver.

26. A method for an optical transceiver to persistently log operational data, the method comprising the following:
    an act of the optical transceiver identifying first operational information regarding the optical transceiver;
    after the act of identifying the first operational information, an act of the optical transceiver writing first log information representing the first operational information to a persistent memory within the optical transceiver;
    an act of the optical transceiver identifying second operational information regarding the optical transceiver; and
    after the act of identifying the second operational information, an act of the optical transceiver writing second log information representing the second operational information to the persistent memory within the optical transceiver, wherein the first and second operational information is not used to control the transceiver wherein the second operational information represents:
        a laser wavelength approximation;
        a laser temperature measurement;
        a supply voltage measurement;
        a transceiver temperature measurement;
        a Thermo Electric Cooler (TEC) current measurement; or
        an acceleration measurement; and
    wherein the first operational information represents:
        a total operation time for the optical transceiver;
        a number of times the optical transceiver has been booted;
        an average operational time between boots;
        a total number of error conditions encountered;
        an identification of one or more error conditions encountered; or
        a categorization of the number of error conditions encountered for a plurality of different error types.

27. A method for an optical transceiver to persistently log operational data, the method comprising the following:
    an act of the optical transceiver identifying first operational information regarding a first operational parameter of the optical transceiver;
    after the act of identifying the first operational information, an act of the optical transceiver writing first log information representing the first operational information to a persistent memory within the optical transceiver;
    an act of the optical transceiver identifying second operational information regarding a second operational parameter of the optical transceiver;
    after the act of identifying the second operational information, an act of the optical transceiver writing second log information representing the second operational information to the persistent memory within the optical transceiver;
    an act of the optical transceiver identifying third operational information regarding a third operational parameter of the optical transceiver;
    after the act of identifying the third operational information, an act of the optical transceiver writing third log information representing the third operational information to a persistent memory within the optical transceiver;
    an act of the optical transceiver identifying fourth operational information regarding a fourth operational parameter of the optical transceiver; and
    after the act of identifying the fourth operational information, an act of the optical transceiver writing fourth log information representing the fourth operational information to the persistent memory within the optical transceiver, wherein the first operational information, second operational information, third operational information, and fourth operational information are stored together on the persistent memory within the optical transceiver, wherein:
    the first operational information represents a total operation time for the optical transceiver;
    the second operational information represents a number of times the optical transceiver has been booted;
    the third operational information represents an average operational time between boots; and
    the fourth operational information represents one or more measured operational parameters of the optical transceiver.

* * * * *

UNITED STATES PATENT AND TRADEMARK OFFICE
CERTIFICATE OF CORRECTION

PATENT NO.        : 7,493,048 B2
APPLICATION NO.   : 10/883209
DATED             : February 17, 2009
INVENTOR(S)       : Dybsetter et al.

Page 1 of 3

It is certified that error appears in the above-identified patent and that said Letters Patent is hereby corrected as shown below:

Drawings
Sheet 1, replace Figure 2 with the figure depicted below, wherein the item "Other Analog Components 202" has been relabeled --Other Analog Components 215--

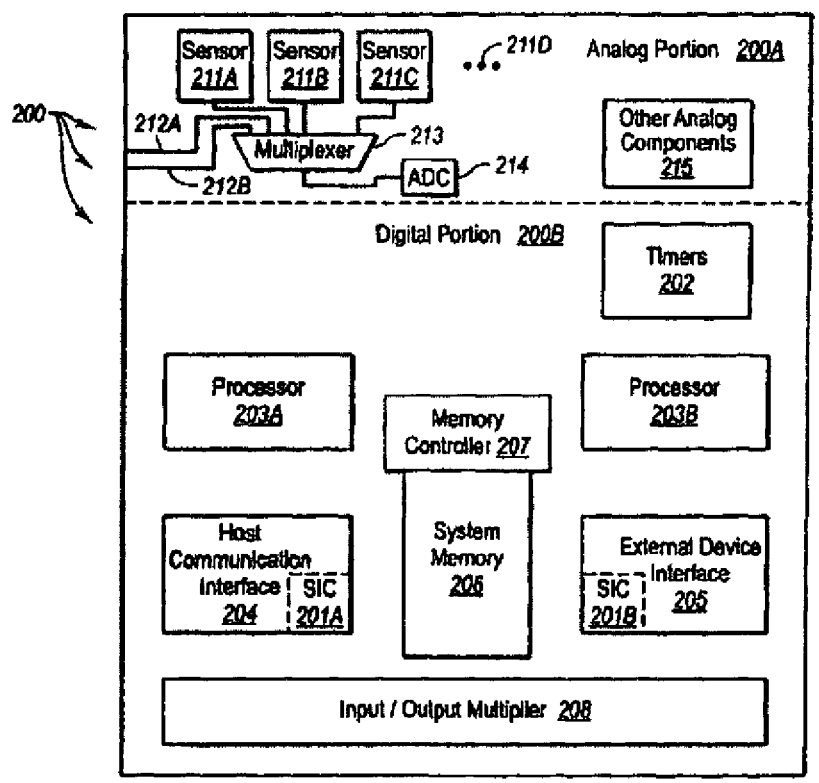

Fig. 2

Sheet 2, replace Figure 3 with the figure depicted below, wherein "Querier 313" has been correctly Signed and Sealed this
Twenty-second Day of February, 2011

David J. Kappos
*Director of the United States Patent and Trademark Office* relabeled --Querier 314--

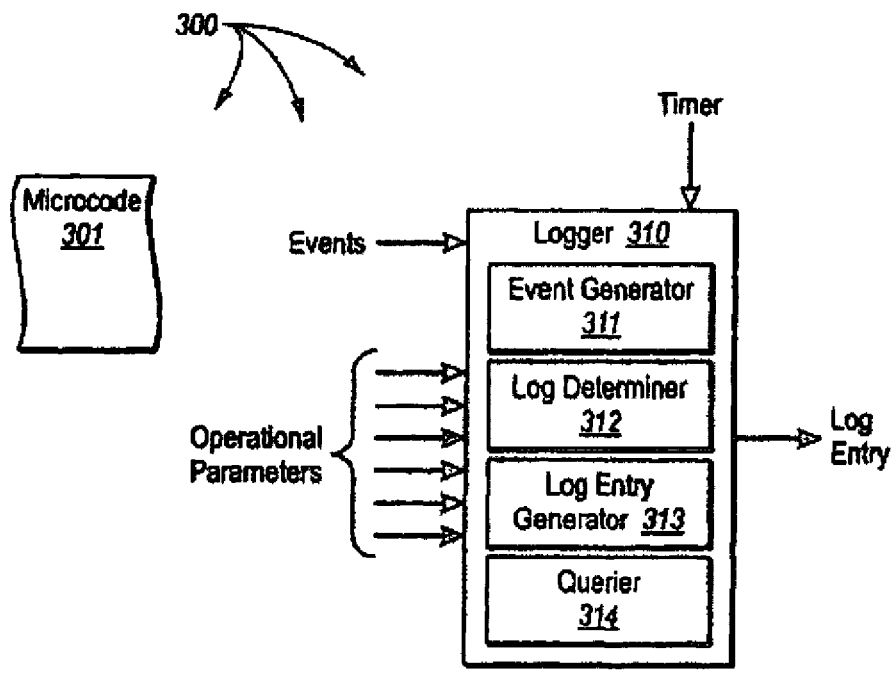

Fig. 3

Column 1
Line 43, change "post -amplifier" to --post-amplifier--.
Line 47, change "to the" to --to as the--
Line 49, change "of optical" to --of the optical--

Column 4
Line 1, change "rates" to --rate--
Line 22, change "110B" to --110B,--
Line 46, change "506" to --106--
Line 65, remove [and] before "analog"

Column 5
Line 1, change "generator" to --generators--
Line 33, change "generator" to --generators--
Line 54, change "operation" to --operations--
Line 67, change "105" to --205--

Column 6
Line 39, change "microcode instructions 301" to --microcode 301 instructions--

Column 7

Line 4, change "303" to --313--
Line 5, change "105" to --205--